United States Patent
Paczkowski et al.

(10) Patent No.: US 11,540,345 B2
(45) Date of Patent: Dec. 27, 2022

(54) DATA CONNECTION RECOVERY FOR ELECTRONIC DEVICES IN A WIRELESS NETWORK

(71) Applicant: T-Mobile Innovations LLC, Overland Park, KS (US)

(72) Inventors: Lyle W. Paczkowski, Mission Hills, KS (US); William M. Parsel, Overland Park, KS (US)

(73) Assignee: SPRINT COMMUNICATIONS COMPANY LP, Overland Park, KS (US)

( * ) Notice: Subject to any disclaimer, the term of this patent is extended or adjusted under 35 U.S.C. 154(b) by 76 days.

(21) Appl. No.: 17/176,888

(22) Filed: Feb. 16, 2021

(65) Prior Publication Data

US 2022/0264685 A1 Aug. 18, 2022

(51) Int. Cl.
*H04W 4/00* (2018.01)
*G06F 15/16* (2006.01)
(Continued)

(52) U.S. Cl.
CPC ............ *H04W 76/19* (2018.02); *H04W 4/70* (2018.02); *H04W 24/02* (2013.01); *H04W 24/08* (2013.01); *H04W 48/18* (2013.01); *H04W 60/04* (2013.01)

(58) Field of Classification Search
CPC ....... H04W 76/19; H04W 4/70; H04W 24/02; H04W 24/08; H04W 48/18; H04W 60/04
(Continued)

(56) References Cited

U.S. PATENT DOCUMENTS

2010/0296394 A1* 11/2010 Krzanowski ........ H04L 12/4625
  370/228
2014/0301181 A1* 10/2014 Suryavanshi ....... H04L 43/0811
  370/218
(Continued)

FOREIGN PATENT DOCUMENTS

WO 20180082521 A1 5/2018

OTHER PUBLICATIONS

Paczkowski, Lyle W., et al., "Data Connection Recovery for Electronic Devices in a Wireless Network," filed Nov. 23, 2021 International Application No. PCT/US2021/060665.
(Continued)

*Primary Examiner* — Mark G. Pannell

(57) ABSTRACT

A data connection recovery system is disclosed that includes a data connection management platform configured to monitor a status of a data connection of a wireless communication device with a wireless network. In response to a determination that the data connection is nonfunctional, the data connection management platform is configured to initiate a command to the wireless communication device via a control plane of the wireless network commanding the wireless communication device to switch to a different network slice in a user plane of the wireless network. The system also includes a remote device manager on the wireless communication device configured to receive the command and to initiate establishment of a new data connection with the wireless network via the different network slice in response to the command. The wireless communication device transmits data via the new data connection.

19 Claims, 8 Drawing Sheets

(51) Int. Cl.
*H04W 76/19* (2018.01)
*H04W 4/70* (2018.01)
*H04W 24/02* (2009.01)
*H04W 24/08* (2009.01)
*H04W 48/18* (2009.01)
*H04W 60/04* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 2016/0036625 | A1* | 2/2016 | Hu | H04L 41/122 |
| | | | | 370/228 |
| 2017/0142591 | A1* | 5/2017 | Vrzic | H04W 24/02 |
| 2017/0245140 | A1* | 8/2017 | Au | H04W 76/27 |
| 2019/0075014 | A1 | 3/2019 | Zhou et al. | |
| 2019/0182884 | A1 | 6/2019 | Deenoo et al. | |
| 2019/0380052 | A1 | 12/2019 | Yang et al. | |
| 2021/0321325 | A1* | 10/2021 | Srivastava | H04L 41/0893 |
| 2021/0385726 | A1* | 12/2021 | Kobayashi | H04L 43/0811 |
| | | | | 370/218 |

OTHER PUBLICATIONS

Al-Rubaye Saba, et al.: "Industrial Internet of Things Driven by SDN Platform for Smart Grid Resiliency", IEEE Internet of Things Journal, IEEE, USA, vol. 6, No. 1, Feb. 1, 2019 (Feb. 1, 2019), pp. 267-277, XP011711600, DOI: 10.1109/JIOT.2017.2734903 [retrieved on Feb. 22, 2019] sections I-IV.

Foreign Communication From a Related Counterpart Application, International Search Report and Written Opinion dated Mar. 18, 2022 International Application No. PCT/US2021/060665 filed on Nov. 23, 2021.

* cited by examiner

DATA CONNECTION RECOVERY FOR ELECTRONIC DEVICES IN A WIRELESS NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In telecommunications, 5G is the fifth generation technology standard for broadband cellular networks. One of the main advantages of the new 5G wireless networks is that they have greater bandwidth, resulting in higher download speeds. The increased speed is achieved partly by using higher-frequency radio waves than prior cellular networks. The advantages of 5G networks are expected to drive new developments in internet of things (IoT) and machine-to-machine (M2M) areas.

SUMMARY

In an embodiment, a data connection recovery system is disclosed. The system comprises a data connection management platform comprising a non-transitory memory and a processor, the data connection management platform configured to monitor a status of a data connection of a wireless communication device with a wireless network, and in response to a determination that the data connection is nonfunctional, initiate a command to the wireless communication device via a control plane of the wireless network commanding the wireless communication device to switch to a different network slice in a user plane of the wireless network. The system also comprises a remote device manager stored in a non-transitory memory of the wireless communication device that when executed by a processor of the wireless communication device receives the command and in response to the command, initiates establishment of a new data connection with the wireless network via the different network slice. The wireless communication device transmits data via the new data connection.

In another embodiment, a data connection recovery method is disclosed. The method comprises monitoring, by a data connection management platform stored in a non-transitory memory and executable by a processor, a status of a data connection of a wireless communication device with a 5G wireless network. The method also comprises, in response to a determination that the data connection is nonfunctional, initiating, by the data connection management platform, a command to the wireless communication device via a control plane of the 5G wireless network commanding the wireless communication device to switch to a different network slice in a user plane of the 5G wireless network. The method additionally comprises receiving, by a remote device manger stored in a non-transitory memory of the wireless communication device and executable by a processor of the wireless communication device, the command and in response to the command, initiating, by the remote device manager, establishment of a new data connection with the 5G wireless network via the different network slice. The method further comprises in response to a determination that the new data connection is nonfunctional and to receipt of direction from the data connection management platform, transmitting, by the wireless communication device, data via the control plane to a database for storage and later transmission to an intended destination.

In yet another embodiment, a data connection recovery method is disclosed. The method comprises monitoring, by a data connection management platform stored in a non-transitory memory and executable by a processor, a status of a data connection of a wireless communication device with a 5G wireless network. The method also comprises, in response to a determination that the data connection is nonfunctional, initiating, by the data connection management platform, a command to the wireless communication device via a control plane of the 5G wireless network commanding the wireless communication device to switch to a different network slice in a user plane of the 5G wireless network. The method additionally comprises receiving, by a remote device manger stored in a non-transitory memory of the wireless communication device and executable by a processor of the wireless communication device, the command and in response to the command, initiating, by the remote device manager, establishment of a new data connection with the 5G wireless network via the different network slice. The method further comprises transmitting, by the wireless communication device, data via the new data connection. The data is directed to an original destination. The method additionally comprises redirecting, by the data connection management platform, transmission of the data to a programmed alternative destination when the data fails to reach the original destination.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
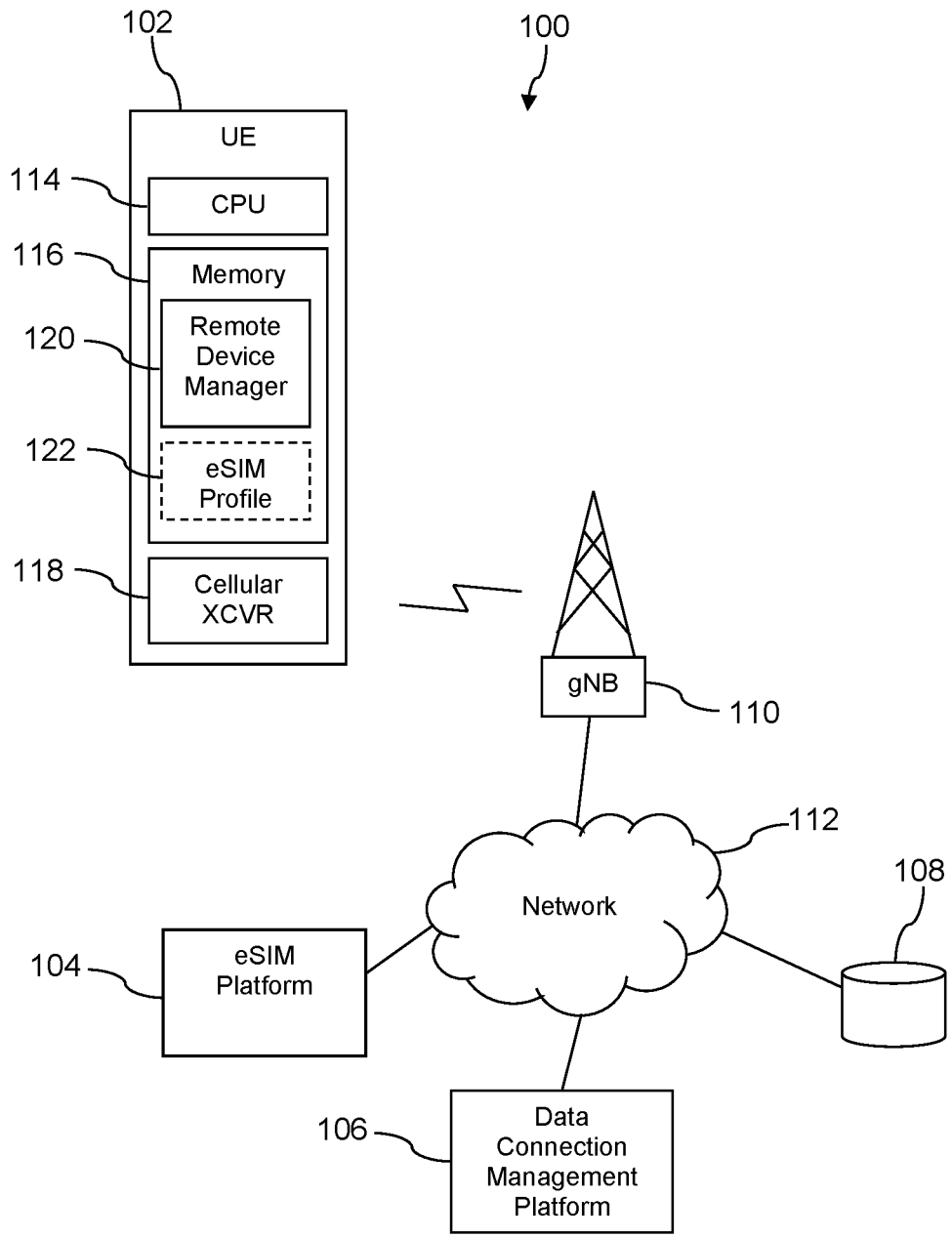
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A problem can develop in a wireless network (e.g., a 5G wireless network) with wireless communication devices such as Internet of Things (IoT) devices and machine-to-machine (M2M) applications where a wireless link remains active (i.e., there is a radio frequency (RF) connection), but the data connection is inoperable. Thus, the IoT device or M2M application is deemed "connected" in that it has a viable wireless link provided to it, but the IoT device or M2M application is not truly "connected" in that it cannot send data (e.g., sensor data) to a target such as a data store or an application.

The pending application is directed to addressing this problem by creation of a data connection management platform that implements a fall back mechanism for data connection recovery. The data connection management platform may be located between the gigabit Node B (gNB) and the core network or within the core network itself and may monitor a status of a data connection of a wireless communication device with the wireless network. The data connection management platform may communicate with an Access and Mobility Management Function (AMF) via an application programming interface (API) in order to determine the status of the data connection. As part of the determination of the status of the data connection, the data connection management platform may send a test message to the wireless communication device on the data channel.

The monitoring by the data connection management platform may be triggered by the wireless communication device. The pending application seeks to identify and rectify data connection issues without entailing repetitions of end-to-end polling through the network, which would take up a large number of network resources if, for example, the large universe of wireless communication devices all phoned home constantly. The techniques of this disclosure attempt to reduce the total load on the network by having the wireless communication device trigger the data connection management platform under predefined conditions such as in response to a result of a ping test performed prior to transmission of data, receipt of a timeout error, or lack of a response within a predetermined amount of time.

If it is determined that the data channel is nonfunctional, the data connection management platform may attempt to move the data connection of the wireless communication device to a different network slice. Network slicing is a form of virtualization that allows multiple logical networks to run on top of a shared physical network infrastructure. Network slicing results in a plurality of different available network slices that can provide different amounts of resources to different types of traffic. For example, in a 5G wireless network, there may be an ultra-reliable low-latency communications (URLLC) network slice, an enhanced mobile broadband (eMBB) network slice, and a massive machine-type communications (mMTC) network slice. The URLLC network slice is typically used for latency-sensitive services such as intelligent transportation or remote surgery, the eMBB network slice is typically used for services that have high requirements for bandwidth such as video-centric applications, and the mMTC network slice is typically used for services that include high requirements for connection density such as a large number of devices that intermittently transmit a small amount of traffic.

If it is determined that the data channel is nonfunctional, the data connection management platform may attempt to move the data connection from a first network slice (e.g., a URLLC network slice) of the wireless network to a second network slice (e.g., an eMBB network slice or a mMTC network slice), which may be an atypical network slice for the service needing a functional data connection. For example, the data connection management platform may initiate a command to the wireless communication device via the control plane of the wireless network commanding the wireless communication device to switch to a different network slice in a user plane of the wireless network. A remote device manager on the wireless communication device may receive the command and initiate establishment of a new data connection with the wireless network via the second network slice. In many instances this may resolve the data connection problem for the wireless communication device. The data connection management platform may analyze what caused the data connection problem, determine when the cause is resolved, and initiate swapping the wireless communication device back to the first network slice. Thus, the data connection platform may enable a functional data connection to be maintained such that the supported service can continue to operate and may also continue to monitor and switch the supported service back to its intended network slice if necessary in such a way that has less network load and impact. The data connection platform can control the network slices used as the data connection fall back as well as total bandwidth consumed.

If a data connection for the wireless communication device cannot be established on a different network slice in the user plane, the data connection platform may direct the wireless communication device to upload data on a control channel via the control plane where this data can be stored and later forwarded. This will advantageously reduce lost data and allow business to continue even during a partial data outage. The wireless communication device may only transmit the data via the control plane to a database for storage and later transmission to an intended destination if communication via each different network slice in the user plane has been attempted without successful establishment of a data connection.

In some scenarios, even if a successful data connection is established via a different network slice in the user plane, the data may still fail to reach its original destination. For example, with a point-of-sale (POS) device, an original destination server might be down which otherwise would make a POS transaction fail. In these scenarios, the data connection management platform may redirect transmission of the data to a programmed alternative destination when the data fails to reach the original destination. Thus, continuing with the POS device example mentioned above, the POS transaction may be redirected to a different server whose address is preestablished with the data connection management platform, thereby enabling the issue to be detected and worked around in real-time such that the POS transaction can be timely completed. In this way, the data connection management platform may avoid lost transactions and allow business to proceed even during a partial outage.

Turning to FIG. 1, a data connection recovery system 100 is described. In an embodiment, the data connection recovery system 100 comprises a user equipment (UE) 102, an eSIM platform 104, a data connection management platform 106, a database 108, a gigabit Node B (gNB) 110, and a network 112.

The UE 102 may comprise a processor 114, a non-transitory memory 116, and a cellular radio transceiver 118. The non-transitory memory 116 may comprise a remote device manager 120 and an eSIM profile 122. The UE 102 may comprise a mobile phone, a smart phone, a personal digital assistant (PDA), a wearable computer, a headset computer, a laptop computer, a notebook computer, a tablet computer, or an Internet of things (IoT) device.

In an embodiment, if the UE 102 comprises an eSIM profile 122, the UE 102 looks up network access credentials that are part of the eSIM profile 122 and presents the network access credentials to the eSIM platform 104 for validation to obtain a wireless communication link. The eSIM platform 104 may comprise a general purpose computer, which is described in greater detail hereinafter with respect to FIG. 7.

Once a wireless communication link is established, the UE 102 may send data via the gNB 110 and the network 112 to an intended destination such as a server or an application. For example, if the UE 102 is an IoT device or if the UE 102 comprises a M2M application, the UE 102 may periodically transmit sensor data to a target destination. However, a problem can develop in a 5G wireless network with the UE 102 where a wireless link remains active (i.e., there is a radio frequency (RF) connection), but the data connection is inoperable. Thus, the UE 102 is deemed "connected" in that it has a viable wireless communication link provided to it by the gNB 110, but the UE 102 is not truly "connected" in that it cannot send data to a target destination. This may result from an error or anomalous state in the user plane of the 5G core network within the network 112. Further details of 5G networks are described below with reference to FIG. 5A and FIG. 5B.

To address this problem, the data connection management platform 106 may implement a fall back mechanism for data connection recovery. The data connection management platform 106 may comprise a general purpose computer, which is described in greater detail hereinafter with respect to FIG. 7. The data connection management platform 106 may be located between the gigabit Node B (gNB) 110 and the network 112. In an embodiment, the data connection management platform 106 is located in the control plane of the 5G core network.

The data connection management platform 106 may monitor and determine a status of a data connection of the UE 102 with the 5G wireless network. In an embodiment, the data connection management platform 106 communicates with an Access and Mobility Management Function (AMF) via an application programming interface (API) in order to determine the status of the data connection. As part of the determination of the status of the data connection, the data connection management platform 106 may send a test message to the UE 102 on the data channel. If the test message fails, the data connection management platform 106 may determine that the data connection is nonfunctional.

The monitoring by the data connection management platform 106 may be triggered by the UE 102. In order to reduce the total load on the network 112, rather than relying on repetitions of end-to-end polling, the remote device manager 120 may trigger the data connection management platform 106 under predefined conditions. For example, the remote device manager 120 may initiate a ping test with the 5G wireless network and transmit a notification to the data connection management platform 106 based on an outcome of the ping test such as when the ping test fails. In another example, the remote device manager 120 may determine that a timeout error has been received by the UE 102 and transmit a notification to the data connection management platform 106 in response to the timeout error. In yet another example, the remote device manager 120 may determine that a response has not been received by the UE 102 within a predetermined amount of time and transmit a notification to the data connection management platform 106 in response to that determination. The predetermined amount of time may be one second, five seconds, one minute, five minutes, ten minutes, or another amount of time. The above exemplary notifications may be transmitted via the control plane of the 5G network if the data connection is nonfunctional at the time of transmission. Receipt of any of the above exemplary notifications by the data connection management platform 106 may trigger the data connection management platform 106 to further investigate the status of the data connection.

The data connection management platform 106 may determine that the data channel is nonfunctional when there is no data connection to the 5G wireless network or when there is intermittent data connection to the 5G wireless network. If the data connection management platform 106 determines that the data channel is nonfunctional, the data connection management platform 106 attempts to move the data communication of the UE 102 to a different network slice in the user plane of the 5G wireless network. For example, the data connection management platform 106 may initiate a command to the UE 102 via the control plane of the 5G wireless network commanding the UE 102 to switch to a different network slice in the user plane of the 5G wireless network. If the UE 102 is initially on an ultra-reliable low-latency communications (URLLC) network slice, the data connection management platform 106 may initiate a command commanding the UE 102 to switch to an enhanced mobile broadband (eMBB) network slice, a massive machine-type communications (mMTC) network slice, or another network slice. The remote device manager 120 on the UE 102 may receive the command and initiate establishment of a new data connection with the 5G wireless network via the different network slice. If the new data connection is established with the 5G wireless network via the different network slice, the UE 102 may transmit data via the new data connection. In some embodiments, the data connection management platform 106 analyzes what caused the data connection problem, determines when the cause is resolved, and initiates swapping the UE 102 back to the initial network slice (e.g., the URLLC network slice).

If the UE 102 is not able to establish a new data connection with the 5G network via the different network slice, the data connection management platform 106 may initiate another command commanding the UE 102 to switch to another network slice (e.g., a mMTC network slice, or another network slice). The remote device manager 120 on the UE 102 may receive the command and initiate establishment of a new data connection with the 5G wireless network via a third different network slice. If the new data connection is established with the 5G wireless network via the third different network slice, the UE 102 may transmit data via the new data connection. If the UE 102 is not able to establish a new data connection with the 5G network via the third different network slice, the cycle may continue until the UE 102 has attempted to establish a data connection with all network slice options.

If a data connection for the UE 102 cannot be established on a different network slice, the data connection management platform 106 may direct the UE 102 to upload data on a control channel via the control plane of the 5G wireless network where this data can be stored, such as in database 108, and later forwarded. In an embodiment, the UE 102 may only transmit the data via the control plane if the UE 102 has exhausted all network slice options. For example, the UE 102 may only transmit the data via the control plan to the database 108 for storage and later transmission to an intended destination if each different network slice has been attempted without successful establishment of a data connection. The UE 102 may continue to try to establish a data connection with the 5G wireless network and once one is established, the UE 102 can forgo transmitting data via the control plane and instead transmit data via a network slice in the user plane.

In some scenarios, even if a successful data connection is established via a different network slice, the data transmitted by the UE 102 may still fail to reach its original destination. In these scenarios, the data connection management platform 106 may redirect transmission of the data to a programmed alternative destination when the data fails to reach the original destination. For example, with a point-of-sale (POS) device, an original destination server might be down, which otherwise would make a POS transaction fail. The data connection management platform 106 may redirect the POS transaction to a different server at a preprogrammed alternative destination, thereby enabling the issue to be detected and worked around in real-time such that the POS transaction can be timely completed.

While represented in FIG. 1 as two different components, in some embodiments, the functionality of the eSIM platform 104 and the data connection management platform 106 may be performed by a single component. For example, if the UE 102 comprises an eSIM profile 122, the eSIM platform 104 may perform the functions discussed above with regard to the data connection management platform 106 rather than having a separate data connection management platform 106.

The UE 102 may communicate via the network 112 with other communication devices or communication systems not shown in FIG. 1. In an embodiment, the network 112 comprises one or more public networks, one or more private networks, or a combination thereof. As discussed above, in an embodiment, the network 112 may comprise, at least in part, a 5G wireless network. 5G communication networks are discussed further hereinafter with reference to FIG. 5A and FIG. 5B.

Figure 2:
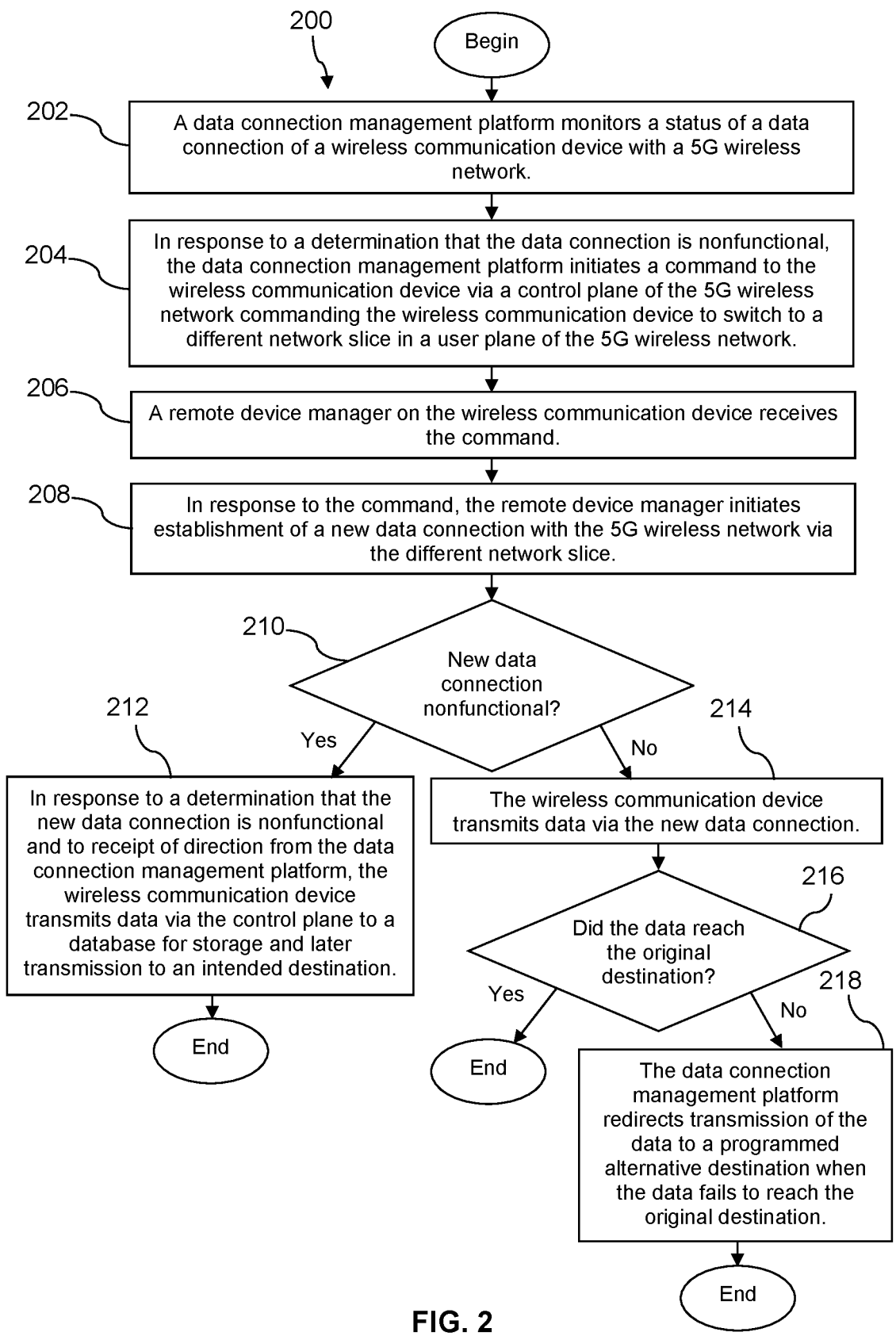
FIG. 2 is a flow chart of a method according to an embodiment of the disclosure.

Turning now to FIG. 2, data connection recovery method is described. At block 202, a data connection management platform (e.g., data connection management platform 106) monitors a status of a data connection of a wireless communication device (e.g., UE 102) with a 5G wireless network. At block 204, in response to a determination that the data connection is nonfunctional, the data connection management platform initiates a command to the wireless communication device via a control plane of the 5G wireless network commanding the wireless communication device to switch to a different network slice in a user plane of the 5G wireless network. At block 206, a remote device manager (e.g., remote device manager 120) on the wireless communication device receives the command. At block 208, in response to the command, the remote device manager initiates establishment of a new data connection with the 5G wireless network via the different network slice.

At block 210, a determination is made whether the new data connection is nonfunctional. At block 212, in response to a determination that the new data connection is nonfunctional and to receipt of direction from the data connection management platform, the wireless communication device transmits data via the control plane to a database (e.g., database 108) for storage and later transmission to an intended destination.

At block 214, if the new data connection is functional, the wireless communication device transmits data via the new data connection. At block 216, a determination is made whether the data reached the original destination. At block 218, when the data fails to reach its original destination, the data connection management platform redirects transmission of the data to a programmed alternative destination.

Figure 3:
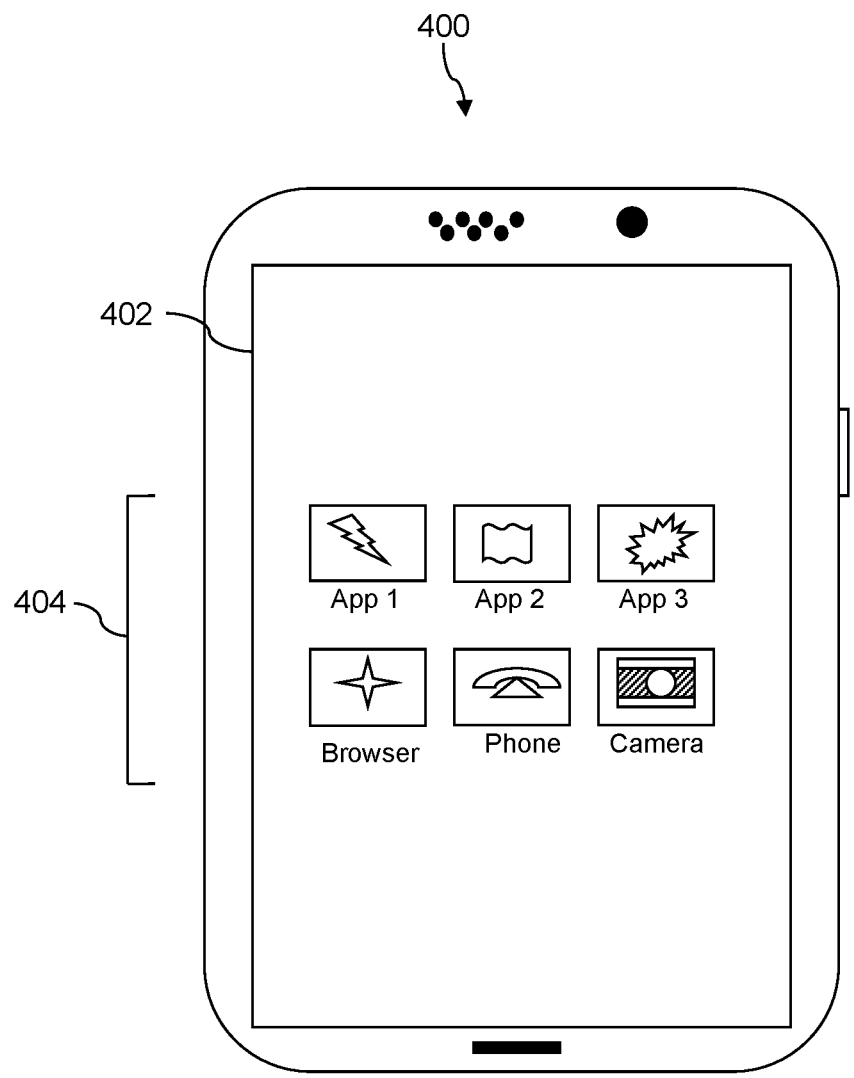
FIG. 3 is an illustration of a user equipment according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
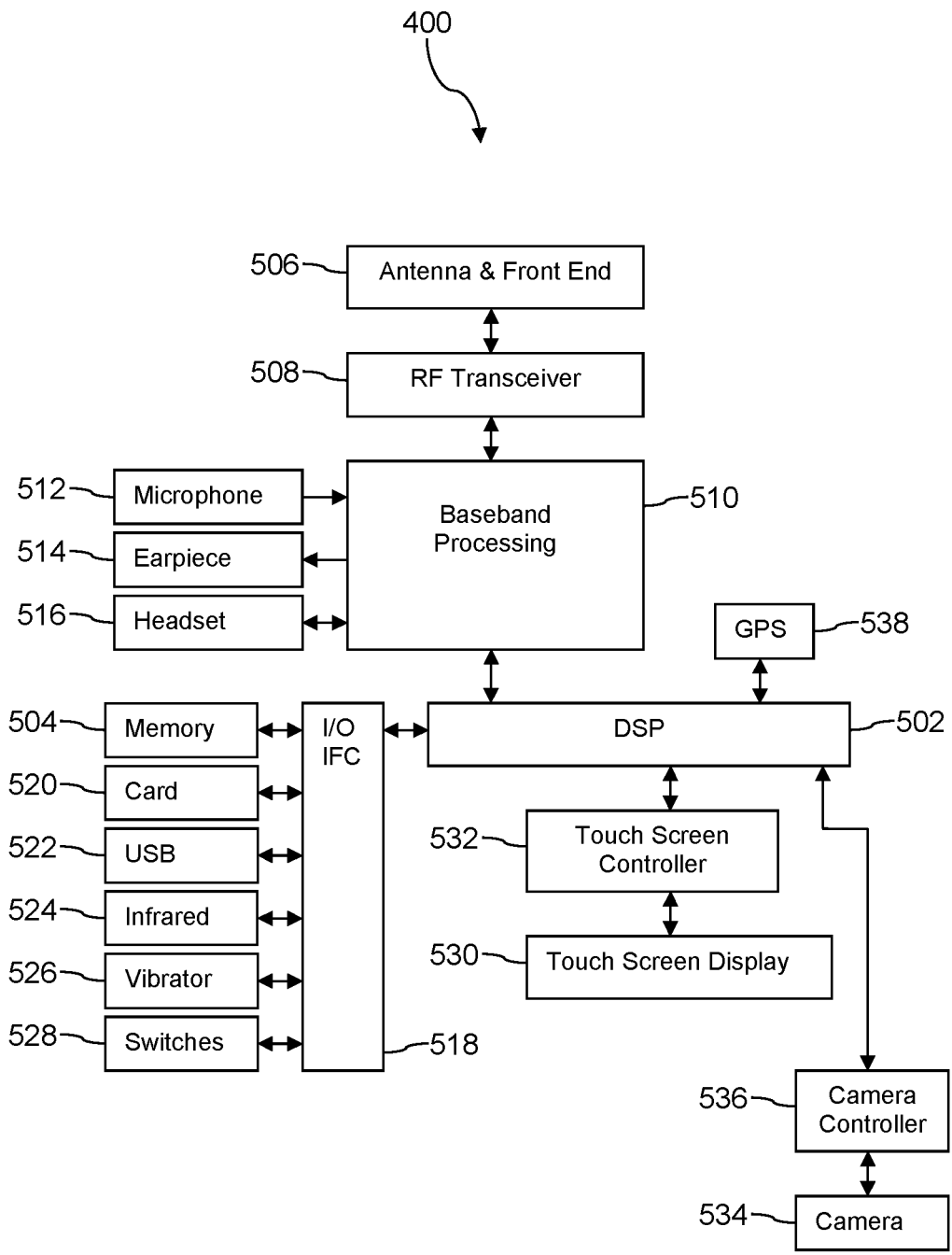
FIG. 4 is a block diagram of a hardware architecture of a user equipment according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
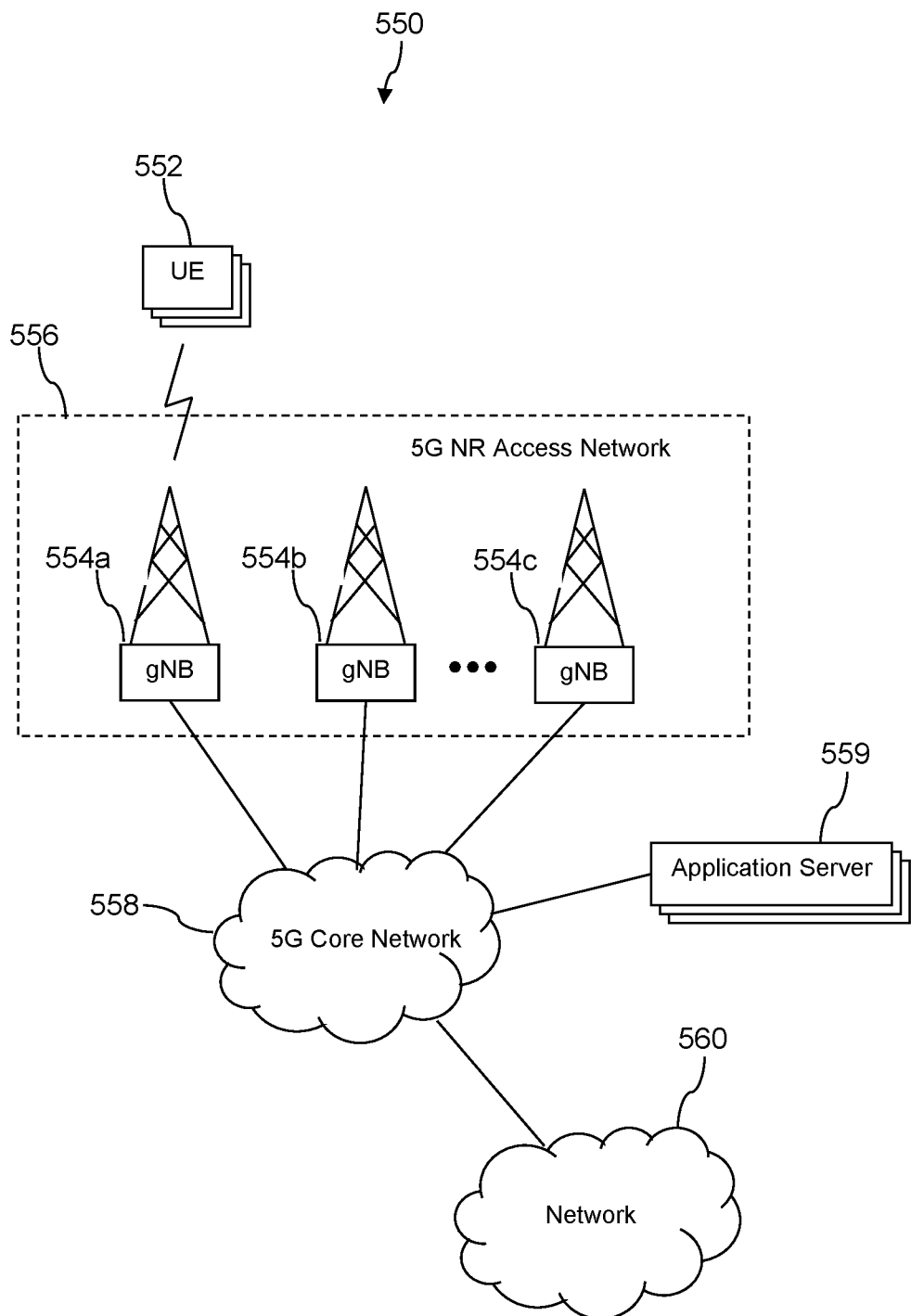
FIG. 5A is a block diagram of a 5G communication network according to an embodiment of the disclosure.
Figure 5B:
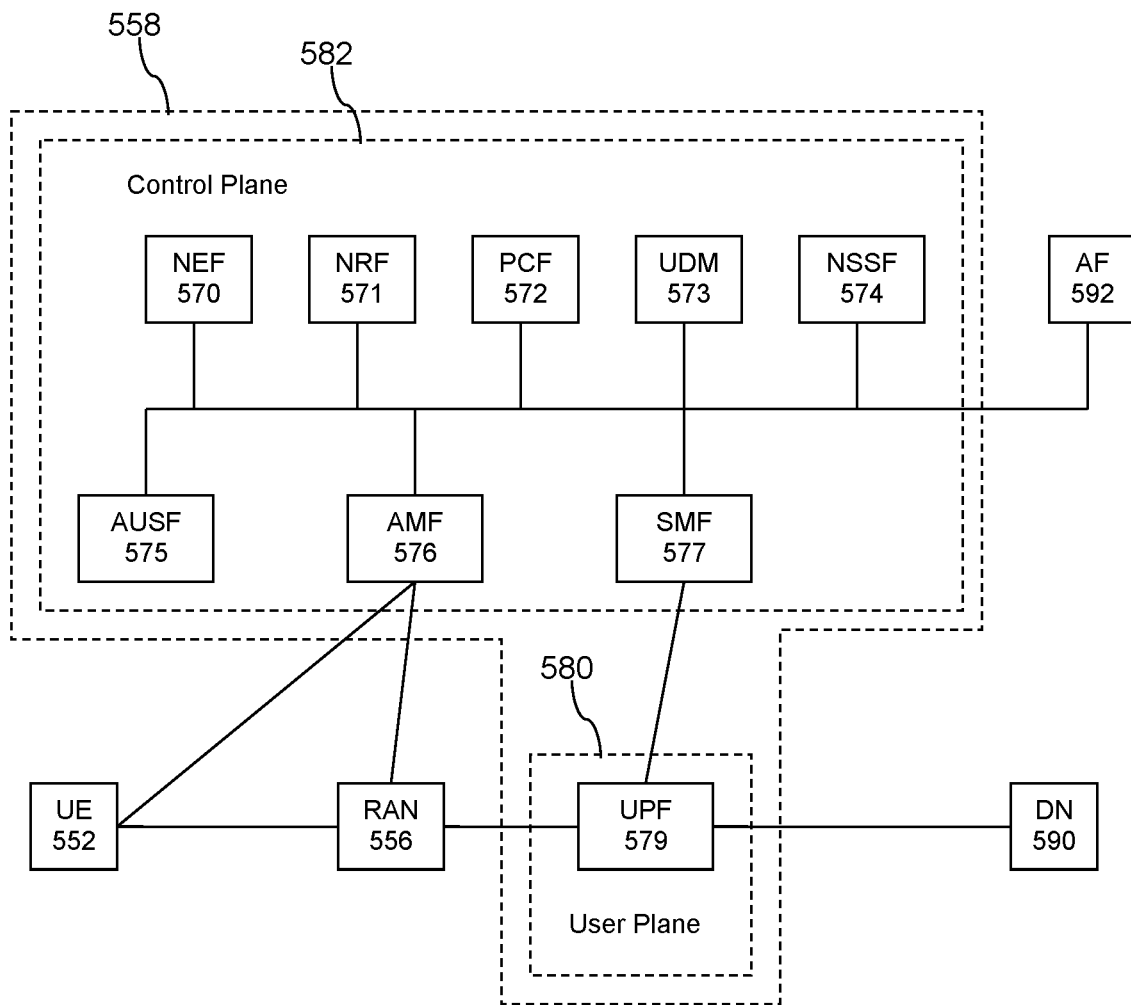
FIG. 5B is a block diagram of a 5G core network according to an embodiment of the disclosure.

Turning now to FIG. 5A and FIG. 5B, 5G communication networks are discussed in more detail, and as discussed above, the network 112 represented in FIG. 1 may comprise, at least in part, a 5G communication network. In FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

Figure 6A:
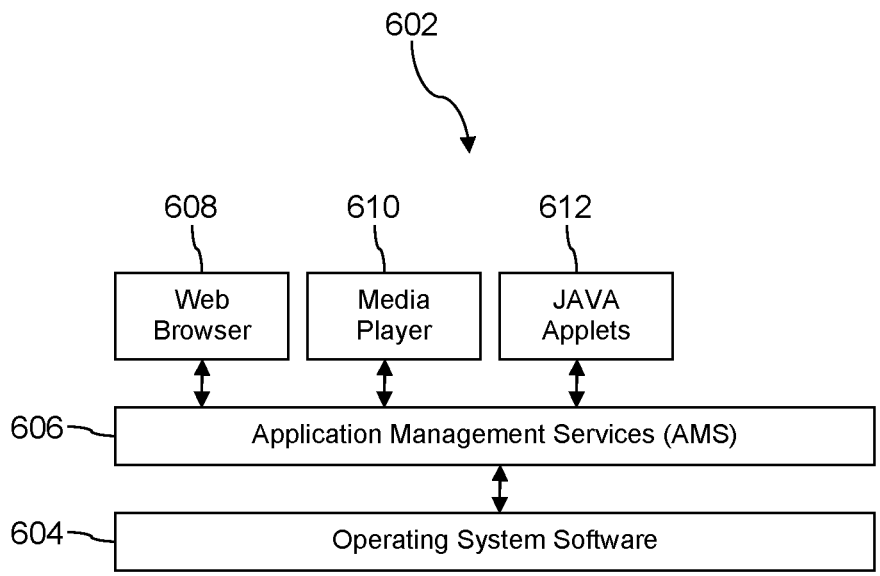
FIG. 6A is a block diagram of a software architecture of a user equipment according to an embodiment of the disclosure.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
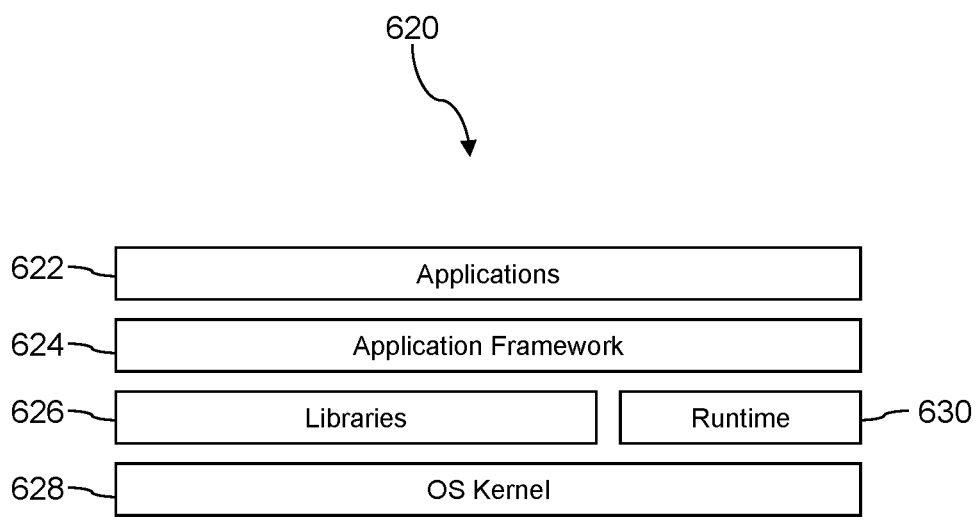
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
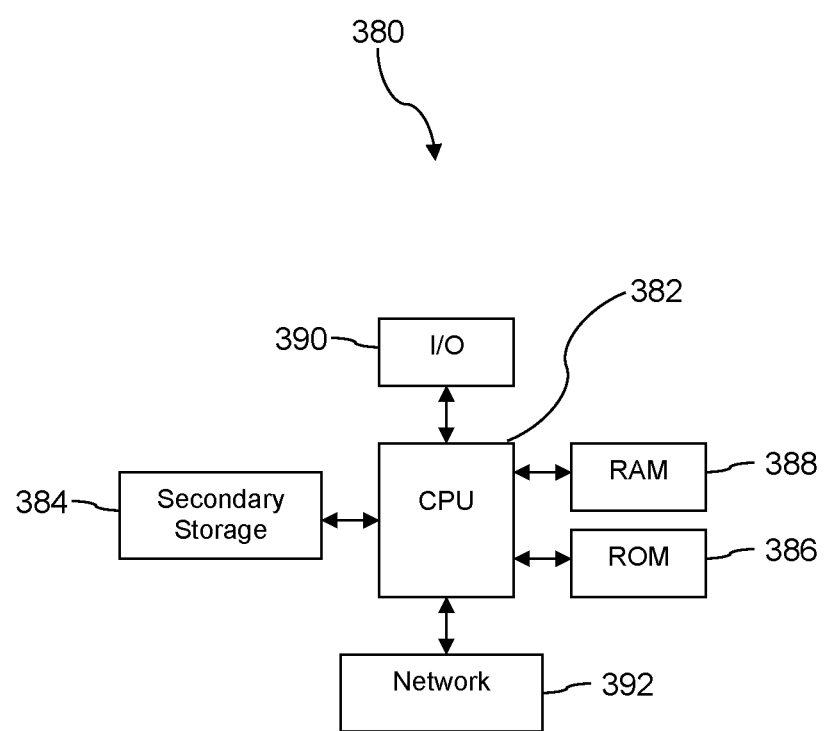
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A data connection recovery system, comprising:
   a data connection management platform comprising a non-transitory memory and a processor, the data connection management platform configured to:
     monitor a status of a data connection of a wireless communication device with a wireless network, wherein the wireless network comprises a 5G wireless network, and wherein the data connection management platform monitors the status of the data connection by communicating with an Access and Mobility Management Function (AMF) in the 5G wireless network via an application programming interface, and
     in response to a determination that the data connection is nonfunctional, initiate a command to the wireless communication device via a control plane of the wireless network commanding the wireless communication device to switch to a different network slice in a user plane of the wireless network; and
   a remote device manager stored in a non-transitory memory of the wireless communication device that when executed by a processor of the wireless communication device:
     receives the command, and
     in response to the command, initiates establishment of a new data connection with the wireless network via the different network slice, wherein the wireless communication device transmits data via the new data connection.

2. The system of claim 1, wherein the data connection management platform monitors the status of the data connection in response to a trigger.

3. The system of claim 2, wherein the remote device manager is further configured to initiate a ping test with the wireless network and transmit a notification to the data connection management platform based on an outcome of the ping test, and wherein the trigger is receipt of the notification.

4. The system of claim 2, wherein the remote device manager is further configured to determine that a timeout error has been received by the wireless communication device and transmit a notification to the data connection management platform in response to the timeout error, and wherein the trigger is receipt of the notification.

5. The system of claim 2, wherein the remote device manager is further configured to determine that a response has not been received by the wireless communication device within a predetermined amount of time and transmit a notification to the data connection management platform in response to the determination, and wherein the trigger is receipt of the notification.

6. The system of claim 1, wherein the data connection is determined to be nonfunctional when there is no data connection to the wireless network or when there is intermittent data connection to the wireless network.

7. The system of claim 1, wherein the different network slice comprises an enhanced mobile broadband (eMBB) network slice or a massive machine-type communications (mMTC) network slice.

8. The system of claim 1, wherein the wireless communication device is a user equipment (UE) that is a mobile phone, a smart phone, a personal digital assistant (PDA), a wearable computer, a headset computer, a laptop computer, a notebook computer, a tablet computer, or an Internet of things (IoT) device.

9. A data connection recovery method, comprising:
   monitoring, by a data connection management platform stored in a non-transitory memory and executable by a processor, a status of a data connection of a wireless communication device with a 5G wireless network;
   in response to a determination that the data connection is nonfunctional, initiating, by the data connection management platform, a command to the wireless communication device via a control plane of the 5G wireless network commanding the wireless communication device to switch to a different network slice in a user plane of the 5G wireless network;
   receiving, by a remote device manger stored in a non-transitory memory of the wireless communication device and executable by a processor of the wireless communication device, the command;
   in response to the command, initiating, by the remote device manager, establishment of a new data connection with the 5G wireless network via the different network slice; and
   in response to a determination that the new data connection is nonfunctional and to receipt of direction from the data connection management platform, transmitting, by the wireless communication device, data via the control plane to a database for storage and later transmission to an intended destination.

10. The method of claim 9, wherein the different network slice comprises an enhanced mobile broadband (eMBB) network slice or a massive machine-type communications (mMTC) network slice.

11. The method of claim 9, wherein the data connection or the new data connection is determined to be nonfunctional when there is no data connection to the 5G wireless network or when there is intermittent data connection to the 5G wireless network.

12. The method of claim 9, further comprising:
initiating, by the remote device manager, a ping test with the 5G network; and
transmitting, by the remote device manager, a notification to the data connection management platform based on an outcome of the ping test, wherein receipt of the notification by the data connection management platform triggers the monitoring of the status of the data connection.

13. The method of claim 9, further comprising:
determining, by the remote device manager, that a timeout error has been received by the wireless communication device; and
transmitting, by the remote device manager, a notification to the data connection management platform in response to the timeout error, wherein receipt of the notification by the data connection management platform triggers the monitoring of the status of the data connection.

14. The method of claim 9, further comprising:
determining, by the remote device manager, that a response has not been received by the wireless communication device within a predetermined amount of time; and
transmitting, by the remote device manager, a notification to the data connection management platform in response to the determination, wherein receipt of the notification by the data connection management platform triggers the monitoring of the status of the data connection.

15. The method of claim 9, wherein the monitoring comprises communicating, by the data management platform via an application programming interface, with an Access and Mobility Management Function (AMF) in the 5G wireless network.

16. The method of claim 9, wherein the data is transmitted via the control plane to the database after attempting to establish a data connection with the 5G network via each different available network slice.

17. A data connection recovery method, comprising:
monitoring, by a data connection management platform stored in a non-transitory memory and executable by a processor, a status of a data connection of a wireless communication device with a 5G wireless network;
in response to a determination that the data connection is nonfunctional, initiating, by the data connection management platform, a command to the wireless communication device via a control plane of the 5G wireless network commanding the wireless communication device to switch to a different network slice in a user plane of the 5G wireless network;
receiving, by a remote device manger stored in a non-transitory memory of the wireless communication device and executable by a processor of the wireless communication device, the command;
in response to the command, initiating, by the remote device manager, establishment of a new data connection with the 5G wireless network via the different network slice;
transmitting, by the wireless communication device, data via the new data connection, wherein the data is directed to an original destination; and
in response to the data failing to reach the original destination, redirecting, by the data connection management platform, transmission of the data to a programmed alternative destination.

18. The method of claim 17, wherein the data connection management platform monitors the status of the data connection in response to a trigger from the remote device manager.

19. The method of claim 17, wherein the data connection is determined to be nonfunctional when there is no data connection to the 5G wireless network or when there is intermittent data connection to the 5G wireless network.

* * * * *